Patented Aug. 13, 1940

2,210,964

UNITED STATES PATENT OFFICE 2,210,964

PARASITICIDAL COMPOSITION

Eric P. Tuennermann, Midland, Mich., assignor to The Dow Chemical Company, Midland, Mich., a corporation of Michigan No Drawing. Application August 23, 1939,
Serial No. 291,496

11 Claims. (Cl. 167—22)

This invention relates to parasiticidal materials, and is particularly concerned with water-miscible liquid chloro-hydrocarbon compositions.

Emulsions of ethylene chloride and other liquid halo-hydrocarbons have been suggested as substitutes for paradichlorobenzene for the control of peach borer and related pests. These improved compositions are essentially fumigants and are more effective at low soil temperatures than is the paradichlorobenzene because of their higher vapor pressure, whereby they may be employed in the late fall, early spring, or even in winter under certain conditions for the control of borer pests. The use of paradichlorobenzene has hitherto been limited to the warm summer months. It has also been found that emulsions of liquid halo-hydrocarbons may be applied to young trees with greater safety than paradichlorobenzene, that they are cheaper and adapted to a wider range of application, and that they require a minimum of soil preparation and substantially no attention subsequent to application.

It has been suggested that alkali metal fish oil soap emulsions of ethylene chloride and related compounds be prepared and utilized for peach borer control. Such compositions, however, have not been entirely satisfactory. These emulsions are of the mayonnaise type and liable to inversion, require high speed stirring or homogenization in preparation, are difficultly diluted with water, and at high dilutions tend to break and separate the oily constituent. A further disadvantage in such compositions is the fact that being oil-water emulsions they are broken and degraded by freezing, and further that they are relatively labile in the presence of traces of hydrogen chloride, such as are commonly found or developed in all liquid chloro-hydrocarbons. A relatively large amount of the fish oil soap and water are required to produce such emulsion compositions, up to 15 per cent by weight of the emulsifier and 35 per cent by weight of water being commonly employed. The compositions obtained, therefore, may contain as little as 50 per cent of the active toxic ingredient whereby a relatively high shipping cost per pound of chloro-hydrocarbon results. A further disadvantage is the fact that such emulsion pastes are so stiff and viscous in nature as to require packaging with specially designed open head drums or similar containers in order that the material may be conveniently removed as desired. The foregoing disadvantages have limited the use and application of these new emulsion compositions and make the development of more satisfactory emulsion concentrates desirable.

I have discovered that when from about 1 to about 5 per cent by volume of an oil-soluble, partially neutralized sulphonated sperm oil is dissolved in a liquid chloro-hydrocarbon, a fluid water-miscible composition is obtained which has desirable properties not obtained in analogous compositions in which other emulsifiers are employed. The concentrates themselves are liquids which do not degrade or decompose on standing, even at sub-zero temperatures. Furthermore, they are readily miscible with large amounts of water to form creamy emulsions stable over relatively long periods of time. My new products are readily prepared by simply stirring the sperm oil emulsifier with the chloro-hydrocarbons. Furthermore, acid-contaminated chloro-hydrocarbons may be utilized therein, since the presence of traces of hydrogen chloride does not adversely affect the desirable miscible characteristics of the compositions. Also, they are cheaper than the old mayonnaise type of emulsion because of the relatively small amounts of emulsifier employed, the ease with which they are prepared, and the reduced handling and packaging costs resulting from their fluid nature. Shipping costs on the basis of the active toxicant are also reduced because of the elimination of the high percentages of water and other inerts ordinarily present in the paste-type compositions.

In practice, the miscible concentrates are commonly diluted with from about 3 to about 15 parts by volume of water to form homogeneous dispersions of the liquid chloro-hydrocarbon adapted to be applied for control of borer insects. Such aqueous emulsions, therefore, contain from about 6 to 30 per cent by volume of the chloro-hydrocarbon and from 0.06 to 1.5 per cent of the emulsifier.

Applications of such aqueous emulsions are generally made by wetting the lower part of the tree trunk and the soil immediately surrounding the tree. This may be accomplished by either spraying or pouring the composition. Several shovelfuls of soil may be placed against the trunk of the tree after treatment to prevent surface loss of the fumigant. Such application may be made at any time of the year but is most effective at the end of the egg-laying period of the borer moth.

While the invention is concerned with the preparation of water-miscible chloro-hydrocarbons broadly, compositions comprising the liquid polychloro aliphatic hydrocarbons are particularly well suited for use as parasiticide concentrates in the preparation of aqueous emulsions for the control of peach borer and related pests. Of the liquid polychloro aliphatic hydrocarbons, ethylene chloride has been found to form the most satisfactory miscible composition with respect to the effectiveness of the resulting emulsions and the comparative stability, ease of preparation, and cost of the miscible concentrate.

Any suitable oil-soluble, partially neutralized sulphonated sperm oil emulsifier may be employed in preparing my new compositions. The emulsifiers found to be particularly satisfactory are those containing from about 0.5 to 1.7 per cent total alkali, from about 8.5 to 9.2 per cent of organic SO₃, and having an acid value of from about 25 to 40. Sperm oil emulsifiers falling within this range contain approximately 25 per cent water, and at room temperature are viscous, oily liquids.

The following examples illustrate the application of the invention, but are not to be construed as limiting the same.

Example 1

2.5 parts by volume of a partially neutralized sulphonated sperm oil was added with stirring to 97.5 parts by volume of ethylene chloride. The emulsifier had a specific gravity of 1.017 at 60°/60° F. and a viscosity at 100° F. of 140.3 seconds. By analysis, this compound was found to contain 3.15 per cent total sulphur and 9.48 per cent non-combustible ash in the form of sodium sulphate. A 10 per cent by volume aqueous solution had a pH of 5.8. The resulting composition was a substantially clear liquid miscible with water at all proportions. When 1 part by volume of the miscible concentrate was diluted with moderate agitation with from 3 to 15 parts by volume of water, creamy ethylene chloride emulsions were obtained which were well adapted for use in the control of peach borer. These aqueous emulsions were comparatively stable, e. g. a 1–15 dilution showed no signs of breaking in 2 hours. While there was a tendency for the fine globules of ethylene chloride to settle to the bottom of the mixture, a substantially homogeneous suspension was readily re-formed by simple stirring. In contrast to this, a 1–15 dilution of an analogous miscible concentrate containing 86 per cent by volume ethylene chloride and 14 per cent by volume triethanol amine oleate broke badly in 2 hours and did not readily re-form with stirring. A similar result was observed with a composition containing 85 per cent ethylene chloride and 15 per cent of a potassium fish oil soap (30 per cent). An aqueous emulsion formed by diluting 1 part by volume of this composition with 15 parts of water broke in 2 hours and was not readily re-formed by agitation.

Example 2

In a similar manner, 97 parts of tetrachloro ethylene and 3 parts by volume of the sperm oil emulsifier described in Example 1 were mixed together to obtain a liquid water-miscible tetrachloro ethylene composition. This composition was compared for stability with a preparation containing 85 per cent tetrachloro ethylene and 15 per cent by volume of a potassium fish oil soap (30 per cent). The fish oil soap emulsion was in the form of a non-flowing, thick paste, which, upon freezing to −10° C. and subsequently thawing, was broken. The composition consisting of tetrachloro ethylene and sperm oil derivative was unaffected by similar exposure to sub-zero temperatures and formed emulsions when diluted with excesses of water which were relatively stable and of value in the control of borer pests.

Example 3

Likewise, compositions were prepared in which 95 parts by volume of monochloro benzene, carbon tetrachloride, chloroform, propylene chloride, trichloro ethylene, and orthodichlorobenzene were mixed with 5 parts by volume of the emulsifier described above. The resulting compositions were liquid, substantially unaffected by freezing, and miscible with water to form relatively stable parasiticidal emulsions.

If desired, various organic fungicides, insecticides, and parasiticides may be incorporated in the foregoing miscible chloro-hydrocarbon preparations to obtain parasiticidal compositions adapted to be applied for various phases of pest control.

Other modes of applying the principle of my invention may be employed instead of those explained, change being made as regards the materials or amounts thereof employed, provided the products claimed in the following claims be thereby obtained.

I therefore particularly point out and distinctly claim as my invention:

1. A water-miscible parasiticide concentrate comprising a solution of a partially neutralized sulphonated sperm oil in a liquid chloro-hydrocarbon.

2. An aqueous parasiticidal emulsion comprising from about 6 to about 30 percent by volume of a liquid chloro-hydrocarbon and from about 0.6 to about 1.5 per cent by volume of a partially neutralized sulphonated sperm oil.

3. A water-miscible parasiticide concentrate comprising a solution of a partially neutralized sulphonated sperm oil in a liquid polychloro aliphatic hydrocarbon.

4. A water-miscible parasiticide concentrate comprising a liquid polychloro aliphatic hydrocarbon in which is dissolved from about 1 to about 5 per cent by volume of a partially neutralized sulphonated sperm oil.

5. A water-miscible parasiticide concentrate comprising a solution of a partially neutralized sulphonated sperm oil in ethylene chloride.

6. A parasiticidal composition comprising a relatively stable dispersion in water of a solution of a partially neutralized sulphonated sperm oil in ethylene chloride.

7. A water-miscible parasiticide concentrate comprising ethylene chloride in which is dissolved from about 1 to about 5 per cent by volume of a partially neutralized sulphonated sperm oil.

8. An aqueous parasiticidal emulsion comprising from about 6 to about 30 per cent by volume of ethylene chloride and from about 0.06 to about 1.5 per cent by volume of a partially neutralized sulphonated sperm oil.

9. An aqueous parasiticidal emulsion comprising:

| | Per cent by volume |
|---|---|
| Ethylene chloride | 6 – 30 |
| Partially neutralized sulphonated sperm oil | 0.06– 1.5 |
| Water | 93.94– 68.5 |
| | 100.00 100.0 |

10. A water-miscible parasiticide concentrate comprising a solution of a partially neutralized sulphonated sperm oil in propylene chloride.

11. A parasiticidal composition comprising a relatively stable dispersion in water of a solution of a partially neutralized sulphonated sperm oil in propylene chloride.

ERIC P. TUENNERMANN.